J. F. VAUGHAN.
FLOW INDICATOR.
APPLICATION FILED JULY 12, 1911.
1,038,803.
Patented Sept. 17, 1912.
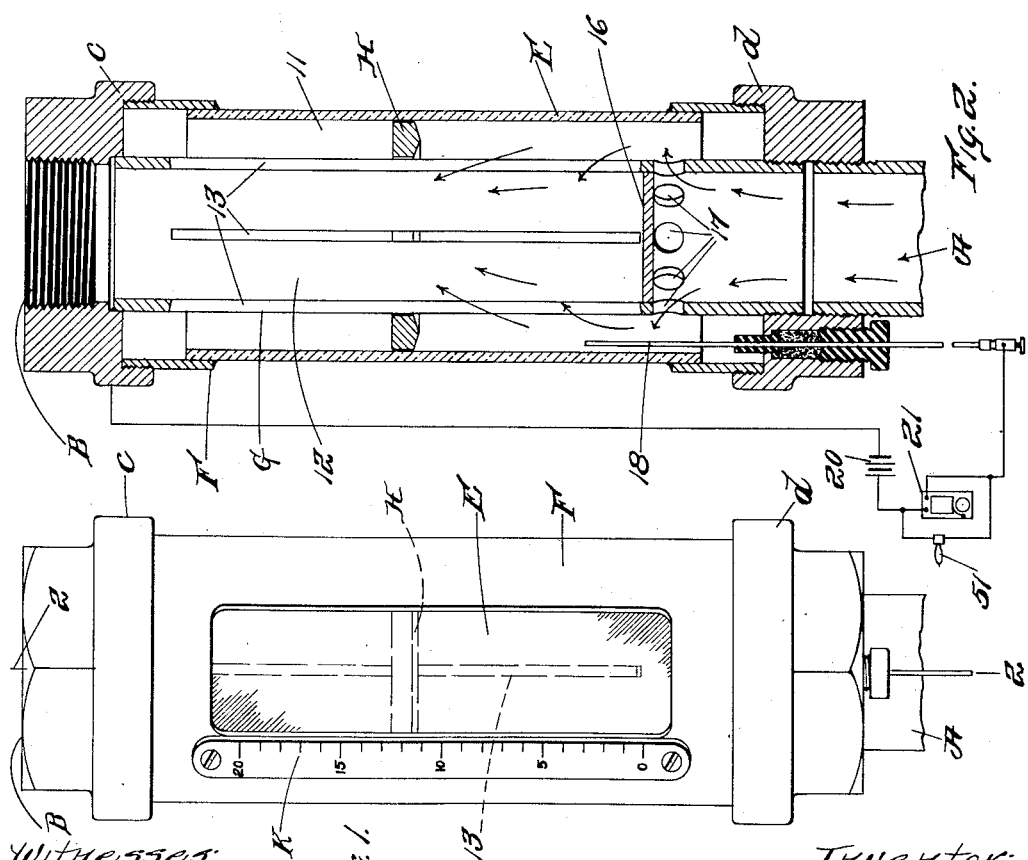

UNITED STATES PATENT OFFICE.

JOHN F. VAUGHAN, OF WELLESLEY HILLS, MASSACHUSETTS.

FLOW-INDICATOR.

1,038,803.  Specification of Letters Patent.  Patented Sept. 17, 1912.

Application filed July 12, 1911. Serial No. 638,087.

*To all whom it may concern:*

Be it known that I, JOHN F. VAUGHAN, a citizen of the United States, residing at Wellesley Hills, county of Middlesex, State of Massachusetts, have invented a certain new and useful Improvement in Flow-Indicators, of which the following is a specification, reference being had therein to the accompanying drawings.

My invention has for its object to provide means for indicating the rate of flow of a fluid in an open or closed conduit and is intended to be used to measure the rate of flow of any fluid but particularly water, oil, steam, gas and air. It is so constructed that it will measure the rate of flow regardless of the pressure in the conduit.

My invention consists essentially in a hollow vessel separated into two chambers by a slotted partition and a member movable relatively to the slotted partition to open the slot more or less in accordance with the rate of flow, the member being moved by the back pressure set up by the flow through the orifice.

In the accompanying drawings I have shown a device embodying my invention, in tubular form and with a glass tube to form the inclosure.

The invention will be fully understood from the following description taken in connection with the accompanying drawings, and the novel features will be pointed out and clearly defined in the claims at the close of the specification.

In the drawings,—Figure 1 is a side elevation of a device embodying my present invention. Fig. 2 is a section on line 2—2 Fig. 1.

Referring now to the drawings there is shown at A the inlet and at B the outlet for the fluid. Suitable means are provided for connecting the device to the conduits, the flow through which is to be measured. Between the top and bottom nuts $c$ and $d$ is secured a glass tube E in any convenient manner, being partly surrounded by a metallic guard F having therein a sight opening as shown in Fig. 1. Within the glass inclosure E is located a slotted tube G which together with a partition 16 divides the space within the inclosure E into two chambers 11 and 12. The chambers 11 and 12 are connected by slots 13, which permit the fluid to flow from the outer chamber 11 to the inner chamber 12. Below the partition 16 is a series of holes 17 through which the fluid passes into the outer chamber 11. A movable member H which in this embodiment of my invention is made in the form of a ring surrounds the slotted tube G and is movable vertically in the outer chamber 11. It will be seen that the fluid passes from the pipe A out through the ports 17 into the outer chamber 11, through the ports 13 into the inner chamber 12, and out through the outlet pipe at the upper end. When there is no flow through the pipe the ring H rests on a stop 18 to be later more fully described but as soon as a flow commences the movable member or ring is raised by the back pressure due to the flow through the orifices 13. Any variation in the rate of flow varies the back pressure and therefore the height to which the ring H rises, and the raising of the ring increases the opening of the orifice and reduces the back pressure so that for any given rate of flow the ring assumes a definite position. A scale K suitably calibrated measures the height to which the movable member rises and therefore the rate of flow.

The device may be adjusted by changing the weight of the movable member or by supplying a ring having a different specific gravity. I find in practice that change in level of the ring is directly proportional to the change in the rate of flow of the liquid and that a change in pressure on the liquid does not affect the device.

The stop 18 may be adjusted vertically in any convenient manner and serves to make electrical contact with the movable member H thus closing the circuit through a battery 20 and bell 21, lamp 51, or other alarm device so that a warning will be given whenever the rate of flow falls below a predetermined point. This is very desirable in electric transformers where the rate of flow of the cooling fluid ought not to fall below a predetermined point.

While I have shown the partition as slotted, it is obvious that it may be otherwise perforated, and therefore in the claims I have used the word perforated to include any partition having a passage therethrough regardless of the shape or number of the passages.

In the foregoing specification I have referred to the movable member as moved by what I have termed back pressure. A careful analysis of the conditions obtaining in the fluid causes me to believe that there is always a constant difference in pressure between the two chambers of the instrument, and that when a change in the rate of flow of the fluid through the instrument occurs, the movable member moves until it has changed the area of the opening through the partition sufficiently to restore the constant difference in pressure between the two chambers. This constant difference in pressure between the two chambers which has been termed "back pressure" is maintained regardless of the initial pressure in the fluid in the conduit and is varied only by change in the rate of flow of the fluid through the instrument.

While I have described only one embodiment of my invention, I believe it to be capable of modification and adaptation and therefore do not limit myself to the specific form shown in the drawings hereto annexed.

What I claim is:—

1. The improved flow indicator comprising a tubular inclosure, a tubular slotted partition separating the interior of said inclosure into two chambers, and an annular movable member coöperating with the slotted partition and moved by the back pressure set up by the flow.

2. The improved flow indicator comprising a tubular inclosure, a second tubular inclosure within the first named inclosure, a barrier dividing said second inclosure into two parts, said second tubular inclosure being slotted on one side of said barrier, and having a port for the passage of the fluid on the other side of the barrier, and an annular movable member coöperating with the slotted portion of the second inclosure, and moved by the back pressure set up by the flow of the fluid.

In testimony whereof I affix my signature, in presence of two witnesses.

JOHN F. VAUGHAN.

Witnesses:
GEORGE P. DIKE,
ALICE H. MORRISON.